(12) United States Patent
Tsirkin

(10) Patent No.: US 11,093,275 B2
(45) Date of Patent: Aug. 17, 2021

(54) PARTIAL SURPRISE REMOVAL OF A DEVICE FOR VIRTUAL MACHINE MIGRATION

(71) Applicant: Red Hat, Inc., Raleigh, NC (US)

(72) Inventor: Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 143 days.

(21) Appl. No.: 16/392,359

(22) Filed: Apr. 23, 2019

(65) Prior Publication Data
US 2020/0341785 A1   Oct. 29, 2020

(51) Int. Cl.
*G06F 9/455* (2018.01)

(52) U.S. Cl.
CPC .. *G06F 9/45558* (2013.01); *G06F 2009/4557* (2013.01); *G06F 2009/45583* (2013.01)

(58) Field of Classification Search
CPC ........ G06F 9/45558; G06F 2009/4557; G06F 2009/45583
See application file for complete search history.

(56) References Cited

U.S. PATENT DOCUMENTS

| | | | |
|---|---|---|---|
| 8,464,259 B2 | 6/2013 | Belay | |
| 9,043,789 B2 | 5/2015 | Tsirkin et al. | |
| 9,753,768 B2* | 9/2017 | Chandrasekaran | ... G06F 9/4856 |
| 10,108,446 B1* | 10/2018 | Steinberg | ............ G06F 9/44521 |
| 10,198,299 B1* | 2/2019 | Xu | .......................... G06F 13/28 |
| 2010/0250824 A1* | 9/2010 | Belay | ................. G06F 9/45558 |
| | | | 711/6 |
| 2012/0054740 A1 | 3/2012 | Chakraborty et al. | |
| 2012/0137292 A1* | 5/2012 | Iwamatsu | ........... G06F 9/45558 |
| | | | 718/1 |
| 2014/0380028 A1* | 12/2014 | Cheng | ................. G06F 9/45558 |
| | | | 713/1 |
| 2015/0234673 A1* | 8/2015 | Miyazaki | ............ G06F 9/45558 |
| | | | 718/1 |
| 2017/0046187 A1 | 2/2017 | Tsirkin | |

FOREIGN PATENT DOCUMENTS

CN    103324532 B    5/2016

OTHER PUBLICATIONS

Izumi, T., "Live Migrate Guests w/PCI Pass-Through Devices," Fujitsu Limited, LinuxCon Japan 2015, Jun. 4, 2015, 25 pgs.
(Continued)

*Primary Examiner* — Emerson C Puente
*Assistant Examiner* — Jonathan R Labud
(74) *Attorney, Agent, or Firm* — Womble Bond Dickinson (US) LLP

(57) ABSTRACT

A method includes disabling, by a hypervisor executed by a processing device of a source host system, host system access of a device associated with a virtual machine, wherein disabling the host system access prevents the virtual machine from directly accessing guest memory via the device and prevents the device from causing an interrupt. The method further includes migrating the guest memory associated with the virtual machine from the source host system to a destination host system. Upon migrating the guest memory associated with the virtual machine from the source host system to the destination host system, initiation of the virtual machine is caused on the destination host system.

17 Claims, 8 Drawing Sheets

(56) References Cited

OTHER PUBLICATIONS

Zhai, E., et al., "Live Migration with Pass-through Device for Linux VM," Jul. 23-26, 2008, Intel Corporation, Proceedings of the Linux Symposium, vol. 2, pp. 261-267.
"Chapter 16. Guest Virtual Machine Device Configuration," Red Hat Customer Portal, Red Hat Inc., 2019, 10 pgs. Retrieved on Jan. 3, 2019 from: https://access.redhat.com/documentation/en-us/red_hat_enterprise_linux/7/html/virtualization_deployment_and_administration_guide/chap-guest_virtual_machine_device_configuration#sect-PCI_devices-Detaching_an_assigned_PCI_device.

* cited by examiner

PARTIAL SURPRISE REMOVAL OF A DEVICE FOR VIRTUAL MACHINE MIGRATION

TECHNICAL FIELD

Aspects of the present disclosure relate to a partial surprise removal of a device for virtual machine migration.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system (OS) of the host machine is typically referred to as the "host operating system." Typically, software on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system."

In a virtualized environment, physical devices, such as network devices or video cards, can be made available to guests by the hypervisor by a process known as device assignment. The hypervisor can create a virtual device within the guest that is associated with the physical device so that any access of the virtual device can be forwarded to the physical device by the hypervisor with little or no modification. Removal of a device from an assigned guest OS without warning (e.g., by simply unplugging it without using a device manager or removal utility), is referred to as "surprise removal."

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
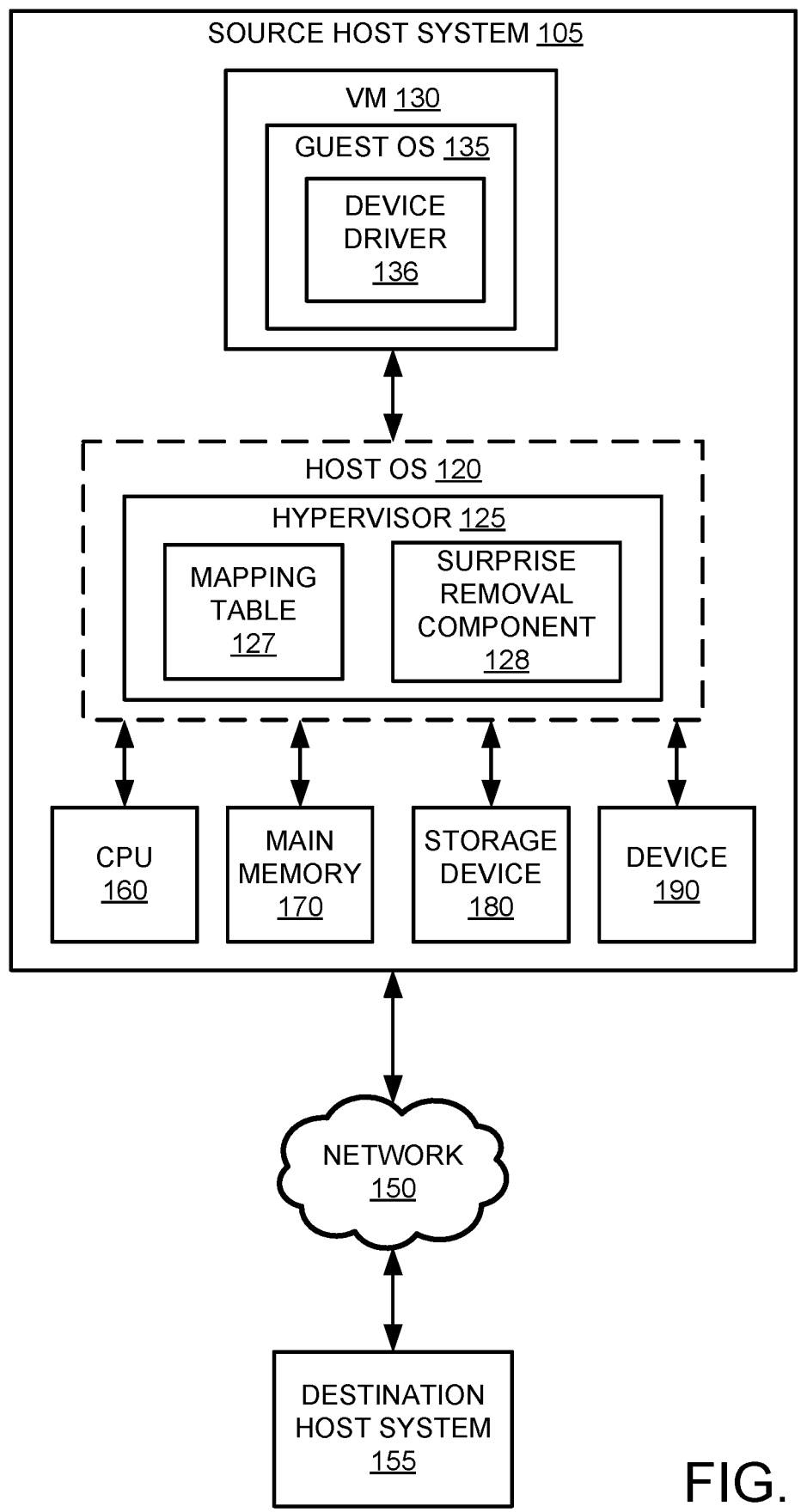
FIG. 1 depicts a high-level component diagram of an example computer system architecture, in accordance with one or more aspects of the present disclosure.

Described herein are methods and systems for partial surprise removal of a PCI device for virtual machine migration. In a virtualized environment, removal of a device from a host computer system can occur prior to the migration of a virtual machine (VM) from a source host system to a destination host system. Typically, removal of a device (such as a Peripheral Component Interconnect (PCI) device) from a VM involves sending a removal notification from the hypervisor of the source host system to the guest OS of the VM and receiving an explicit acknowledgment from the guest OS that indicates that the guest OS has entered a state in which it is safe to remove the device. The acknowledgment from the guest OS is needed to avoid guest OS errors as a result of the device removal prior to the guest OS (also referred to herein as "guest") flushing any associated cache to avoid losing data. For example, the removal of a disk could result in the loss of critical data, or the removal of a network interface controller could result in the loss of networking communication packet information. However, this removal process may be time consuming, particularly if the guest is slow or the guest is not operating properly. In such an example, waiting for an acknowledgement from the guest prior to migrating the VM to the destination host system may result in a delay of the migration of the VM from the source host system to the destination host system.

Aspects of the disclosure address the above and other deficiencies by implementing a partial surprise removal of a device for VM migration. Prior to migrating a VM from a source host system to a destination host system, the hypervisor of the source host system can perform a partial surprise removal of a device by disabling host system access of the device of the source host system that is being utilized by the VM. Disabling the host system access prevents the device from directly accessing and/or modifying the memory of the source host system or causing an interrupt. In some embodiments, the hypervisor may disable the host system access by disabling bus mastering of the device. Bus mastering is a bus architecture that allows a control bus of the device to communicate directly with other components without having to go through the CPU of the host system. For example, a device implementing bus mastering may allow the device to directly access and/or modify data stored at the memory of the source host system without going through the hypervisor executed the processing device of the source host system. By disabling the host system access prior to migration, all requests to modify data or cause interrupts are routed through the hypervisor of the host system. The hypervisor may then determine whether or not to allow the VM to access and/or modify data stored at the memory of the source host system, preventing the loss of critical data, network communication packet information, etc. during the VM migration process.

Once the host system access of the device is disabled, the migration of memory associated with the VM may begin. The memory associated with the VM may be referred to as guest memory and may correspond to a partitioned portion of the memory of the source host system that includes data associated with the VM. A copy of the data stored at the guest memory may be transmitted from the source host system to a destination host system for storage at the memory of the destination host system.

Upon migrating the data associated with the VM, the hypervisor of the source host system may cause the initiation of the VM on the destination host system. In embodiments, the hypervisor of the source host system may cause the initiation of the VM on the destination host system by transmitting a notification to the hypervisor of the destination host system indicating that the migration is complete. Upon receiving the notification, the hypervisor of the destination host system initiates the migrated VM and the migrated VM may proceed to run on the destination host system. In some embodiments, the notification may include information associated with the partial surprise removal of the device from the VM prior to migration. For example, the notification may indicate that a partial surprise removal of the device occurred, what the type of the device that removed was or any other information associated with the partial surprise removal of the device and migration of the VM. In embodiments, the hypervisor of the destination host system may identify and assign a new device to the migrated VM based on the information included with the notification. For example, if the notification indicates that the partial surprise removal of a network interface card (NIC) from the VM prior to migration, upon migration of the VM, the hypervisor of the destination host system may identify and assign a new NIC of the destination host system to the VM.

Accordingly, by performing a partial surprise removal of a device being used by a VM prior to migrating the VM, critical data of the VM can be preserved without delaying the migration of the VM until an acknowledgment of removal of the device has been received from the VM. By no longer requiring a hypervisor to delay the migration of a VM until the acknowledgment is received, the performance of the computing system and the experience of the user of the VM are improved. Although described for the purposes of VM migration, aspects of the disclosure may be implemented for other purposes. For example, aspects of the disclosure may be utilized to generate one or more snapshots of a VM running on the source host system.

FIG. 1 depicts a high-level component diagram of an illustrative example of a computer system architecture 100, in accordance with one or more aspects of the present disclosure. One skilled in the art will appreciate that other computer system architectures 100 are possible, and that the implementation of a computer system utilizing examples of the invention are not necessarily limited to the specific architecture depicted by FIG. 1.

As shown in FIG. 1, computer system architecture 100 includes a source host system 105 and a destination host system 155 that are communicatively coupled via a network 150. The source host system 105 includes one or more central processing units (CPU) 160, main memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, main memory 170 may be non-uniform access (NUMA), such that memory access time depends on the memory location relative to CPU 160. It should be noted that although, for simplicity, a single CPU 160, storage device 180, and device 190 are depicted in FIG. 1, other embodiments of source host system 105 may comprise a plurality of CPUs, storage devices, and devices. Destination host system 155 may include similar components (not shown) to source host system 105, which are omitted for illustrative purposes.

The source host system 105 and/or destination host system 155 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

Source host system 105 may additionally include one or more virtual machine (VM) 130 and host operating system (OS) 120. VM 130 is a software implementation of a machine that executes programs as though it was an actual physical machine. Host OS 120 manages the hardware resources of the computer system and provides functions such as inter-process communication, scheduling, memory management, and so forth.

VM 130 may include a guest operating system (OS) 135 that handles the execution of applications within the virtual machine. Guest OS 135 may control a device 190 through device driver 136. It should be noted that although, for simplicity, a single VM 130 is depicted in FIG. 1, source host system 105 may host multiple VMs 130.

Host OS 120 may include a hypervisor 125, which provides a virtual operating platform for VMs 130 and manages their execution. It should be noted that in some alternative implementations, hypervisor 125 may be external to host OS 120, rather than embedded within host OS 120, or may replace host OS 120. Hypervisor 125 may include mapping table 127 and surprise removal component 128. It should be noted that in some alternative implementations, hypervisor 125 may be external to host OS 120, rather than embedded within host OS 120, or may replace host OS 120.

Surprise removal component 128 can facilitate partial surprise removal for devices 190, as described in detail below with respect to FIGS. 2-6. Mapping table 127 may contain an identifier for VM 130 executing guest OS 135, an identifier for device 190, the device type, or any similar information. Mapping table 127 can be an area of hypervisor memory accessible to surprise removal component 128, a shared memory space, a data structure saved in storage device 180, or the like.

Figure 2:
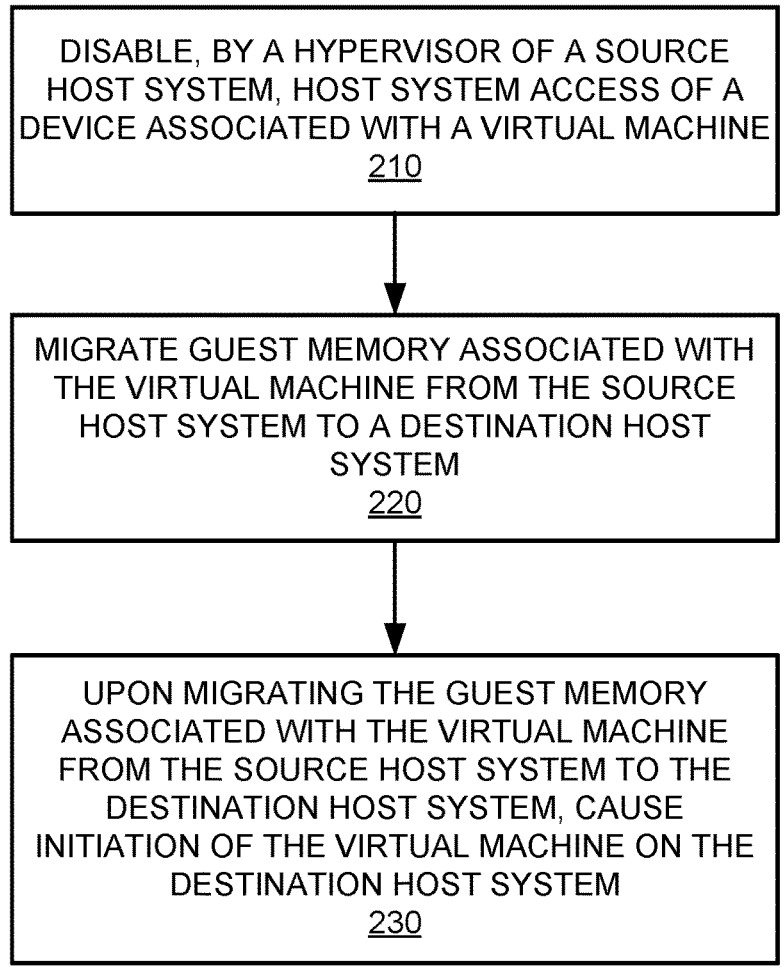
FIG. 2 is a flow diagram of a method of performing a partial surprise removal of a device for virtual machine migration, in accordance with some embodiments of the present disclosure.

FIG. 2 is a flow diagram of a method 200 of performing a partial surprise removal of a device for virtual machine migration, in accordance with some embodiments of the present disclosure. The method 200 may be performed by processing logic that comprises hardware (e.g., circuitry, dedicated logic, programmable logic, microcode, etc.), software (e.g., instructions run on a processing device to perform hardware simulation), or a combination thereof. In embodiments, aspects of method 200 may be performed by surprise removal component 128 of FIG. 1.

With reference to FIG. 2, method 200 illustrates example functions used by various embodiments. Although specific function blocks ("blocks") are disclosed in method 200, such blocks are examples. That is, embodiments are well suited to performing various other blocks or variations of the blocks recited in method 200. It is appreciated that the blocks in method 200 may be performed in an order different than presented, and that not all of the blocks in method 200 may be performed.

Referring to FIG. 2, at block 210 the processing logic disables host system access of a device associated with a VM. In embodiments, the device may be a physical device or a virtual device being utilized by the VM. Disabling the host system access of the device may prevent the VM from accessing and/or modifying the memory of the source host system via the device and may prevent the device from causing interrupts. In some embodiments, the processing logic may disable host system access of the device by disabling bus mastering of the device. Upon disabling host system access of the device, any requests to access and/or modify data stored at the memory of the source host system are routed through the hypervisor. The hypervisor may then determine whether or not to permit the VM to access the memory of the source host system, as will be described in further detail below.

At block 220, the processing logic migrates guest memory associated with the VM from the source host system to a destination host system. The processing logic may migrate the guest memory of the VM by transmitting a copy of the data stored at the guest memory to the destination host system for storage at the memory of the destination host system. In embodiments, once the migration of the guest memory has begun, the hypervisor may prevent the VM from accessing and/or modifying the data stored at the guest memory to prevent any loss of data. In some embodiments, the hypervisor may allow the VM to access data stored at the guest memory that has not yet been transmitted to the destination host system, but may not allow the VM to access data stored at the guest memory that has been transmitted to the host system, as will be described in further detail below.

At block 230, upon migrating the guest memory associated with the VM from the source host system to the destination host system, the processing logic may cause initiation of the VM on the destination host system. In embodiments, the hypervisor of the source host system may cause the initiation of the VM on the destination host system by transmitting a notification to the hypervisor of the destination host system indicating that the migration is complete, which may cause the hypervisor of the destination host system to initiate the VM on the destination host system.

Figure 3A:
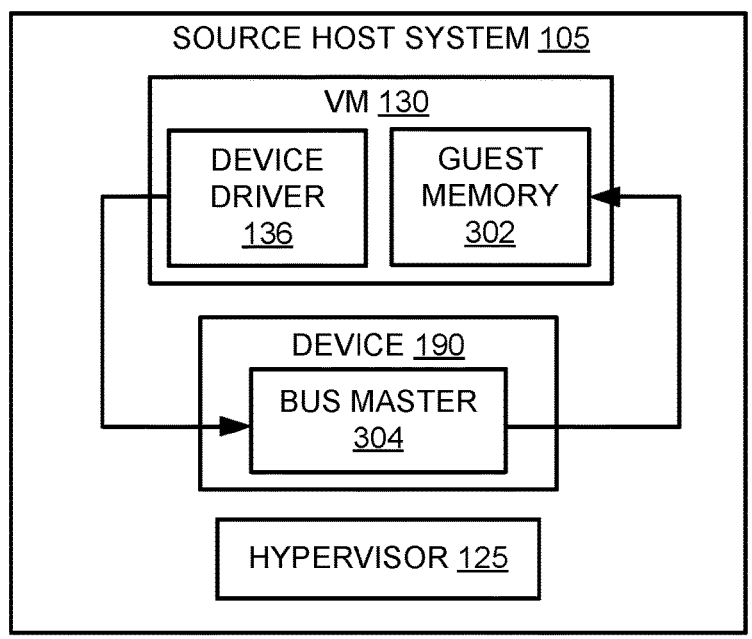
FIG. 3A is an illustration of an example of a virtual machine utilizing a device with direct host system access in accordance with embodiments of the disclosure.

FIG. 3A is an illustration 300 of an example of a virtual machine utilizing a device with direct host system access in accordance with embodiments of the disclosure. Illustration 300 includes components as previously described at FIG. 1. For illustrative purposes, some components of source host system 105 have been omitted. Illustration 300 further includes guest memory 302 that may correspond to a partitioned portion of the memory of the source host system 105 that includes data associated with the VM.

Referring to FIG. 3A, device 190 includes a bus master 304 which allows device 190 to directly access the guest memory 302 without going through hypervisor 125, which is executed by the CPU of source host system 105. Accordingly, directions may be provided from device driver 136, which is executed by VM 130, to device 190 that cause the device 190 to access and/or modify data in the guest memory 302.

Figure 3B:
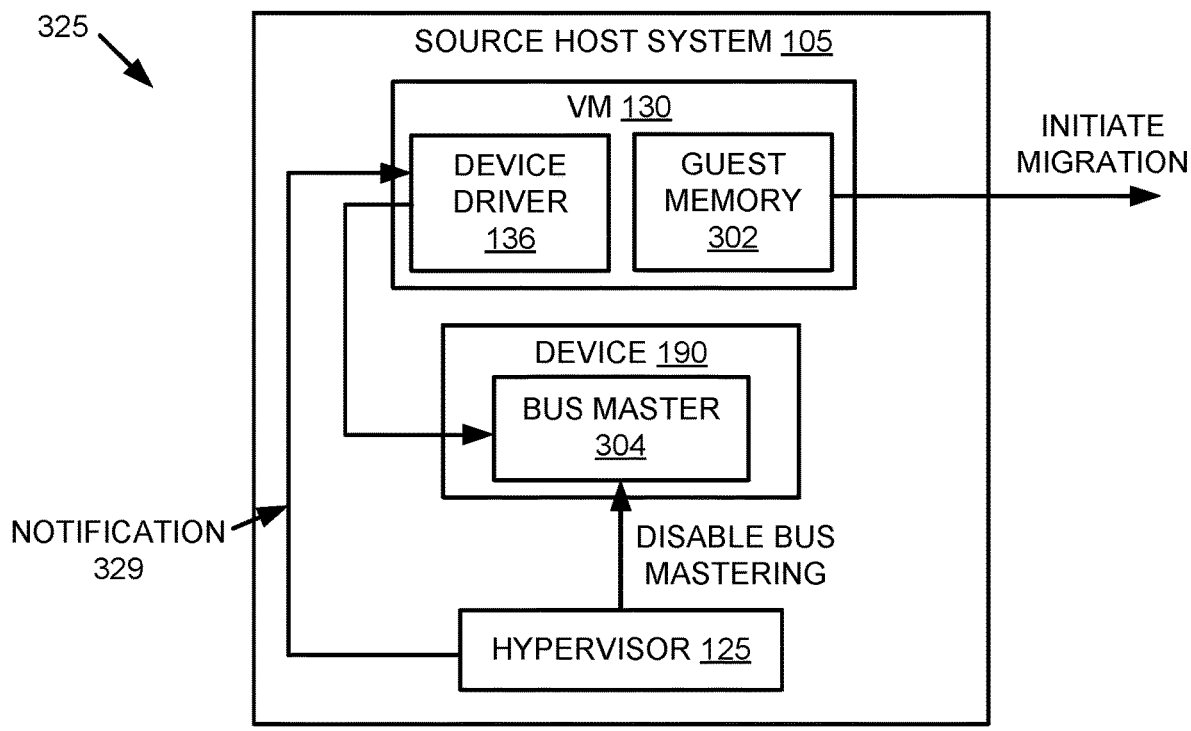
FIG. 3B is an illustration of an example of a hypervisor disabling bus mastering of a device associated with a virtual machine in accordance with some embodiments of the disclosure.

FIG. 3B is an illustration 325 of an example of a hypervisor disabling bus mastering of a device associated with a virtual machine in accordance with some embodiments of the disclosure. Prior to the migration of VM 130 from source host system 105, hypervisor 125 may transmit a direction that disables the bus mastering of device 190 to bus master 304. Once bus mastering has been disabled, device 190 may no longer be able to directly access guest memory 302. In some embodiments, upon disabling the bus mastering of device 190, the hypervisor 125 may provide a notification 329 to the device driver 136 that notifies the device driver 136 of the partial surprise removal of the device 190. By disabling the bus mastering, new data cannot be written to guest memory 302 by the device 190 and existing data cannot be modified at the guest memory 302 by device 190 without going through hypervisor 125, preventing the loss of data during the migration process.

Once bus mastering has been disabled, hypervisor 125 may initiate migration by transmitting a copy of the data stored at the guest memory 302 to the destination host system (not shown). During the migration of the guest memory 302, device driver 136 of VM 130 may access device 190, but any requests to access and/or modify the guest memory 302 by VM 130 may be routed through hypervisor 125.

Figure 3C:
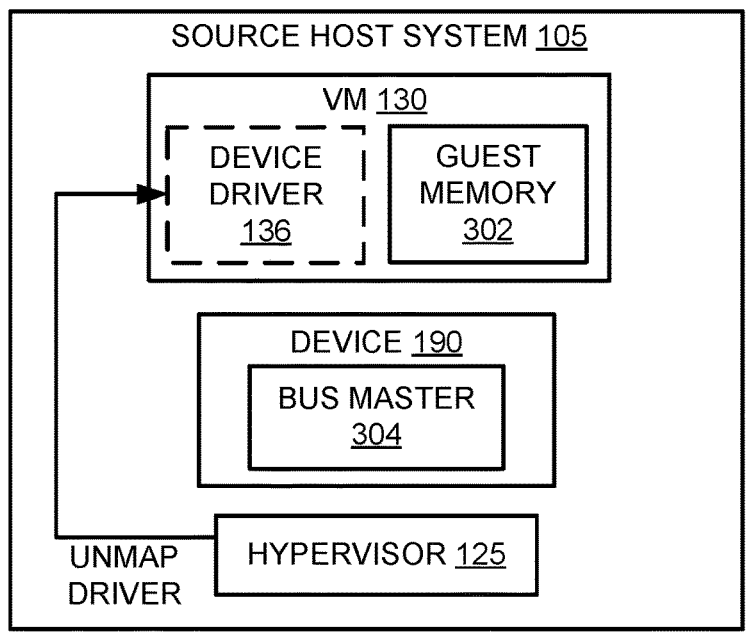
FIG. 3C is an illustration of an example of a hypervisor of a source host system unmapping a device driver utilized by a virtual machine in accordance with embodiments of the disclosure.

FIG. 3C is an illustration 350 of an example of a hypervisor of a source host system unmapping a device driver utilized by a virtual machine in accordance with embodiments of the disclosure. In illustration 350, the migration of the guest memory 302 from source host system 105 to the destination host system (not shown) is complete. Upon completion of the migration, the hypervisor 125 may unmap the physical address of the device driver 136 in the memory of the source host system 105 to VM 130. Upon unmapping the device driver 136 from VM 130, hypervisor 125 may migrate the state of VM 130 by copying the VM state from source host system 105 to the destination host system 155.

Figure 3D:
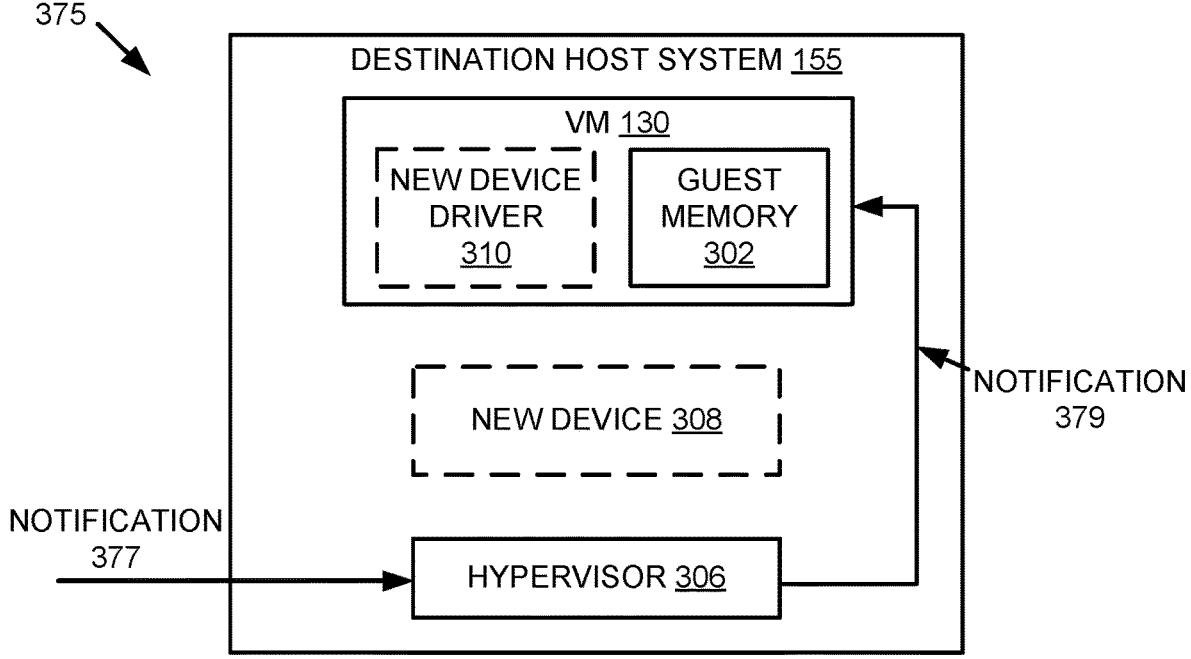
FIG. 3D is an illustration of an example of initiating a migrated VM on a destination host system in accordance with embodiments of the disclosure.

FIG. 3D is an illustration 375 of an example of initiating a migrated VM on a destination host system in accordance with embodiments of the disclosure. In illustration 375, destination host system 155 has received the data stored at the guest memory 302 and state associated with VM 130 from the source host system (not shown). In some embodiments, the hypervisor 306 of destination host system 155 may receive a notification 377 from the hypervisor of the source host system indicating that the migration of VM 130 is complete. Upon receiving the notification 377, hypervisor 306 may initiate execution of VM 130 on the destination host system 155.

In embodiments, notification 377 may include information associated with the partial surprise removal of the device 190 from the VM 130 prior to migration. For example, the notification may indicate that a partial surprise removal of the device occurred, the type of the device or any other information associated with the partial surprise removal and migration of the VM. Upon receiving the notification 377, the hypervisor 306 may identify and assign a new device 308 to the migrated VM 130 based on the information included with the notification 377. For example, if the notification 377 indicates the partial surprise removal of a network interface card (NIC) from the VM 130 prior to migration, the hypervisor 306 may identify and assign a new NIC of the destination host system 155 to the VM 130. The hypervisor 306 may also map the physical address a new device driver 310 associated with the new device 308 on the memory of the destination host system 155 to VM 130 for use by VM 130 to access the new device 308. In some embodiments, upon receiving notification 377, hypervisor 306 may transmit a notification 379 to VM 130 that notifies the VM 130 of the partial surprise removal of device 190 and migration to destination host system 155.

In some embodiments, the source host system and destination host system 155 may have the capability to save and restore the device state. If the source host system and destination host system 155 both include the same device (e.g., device 190 is the same device as device 308), the source host system may save the state of the device and provide the state of the device with notification 377. Upon receiving notification 377 that includes the device state, the destination host system 155 may restore the device (e.g., device 308) for use by VM 130 on the destination host system.

Figure 4:
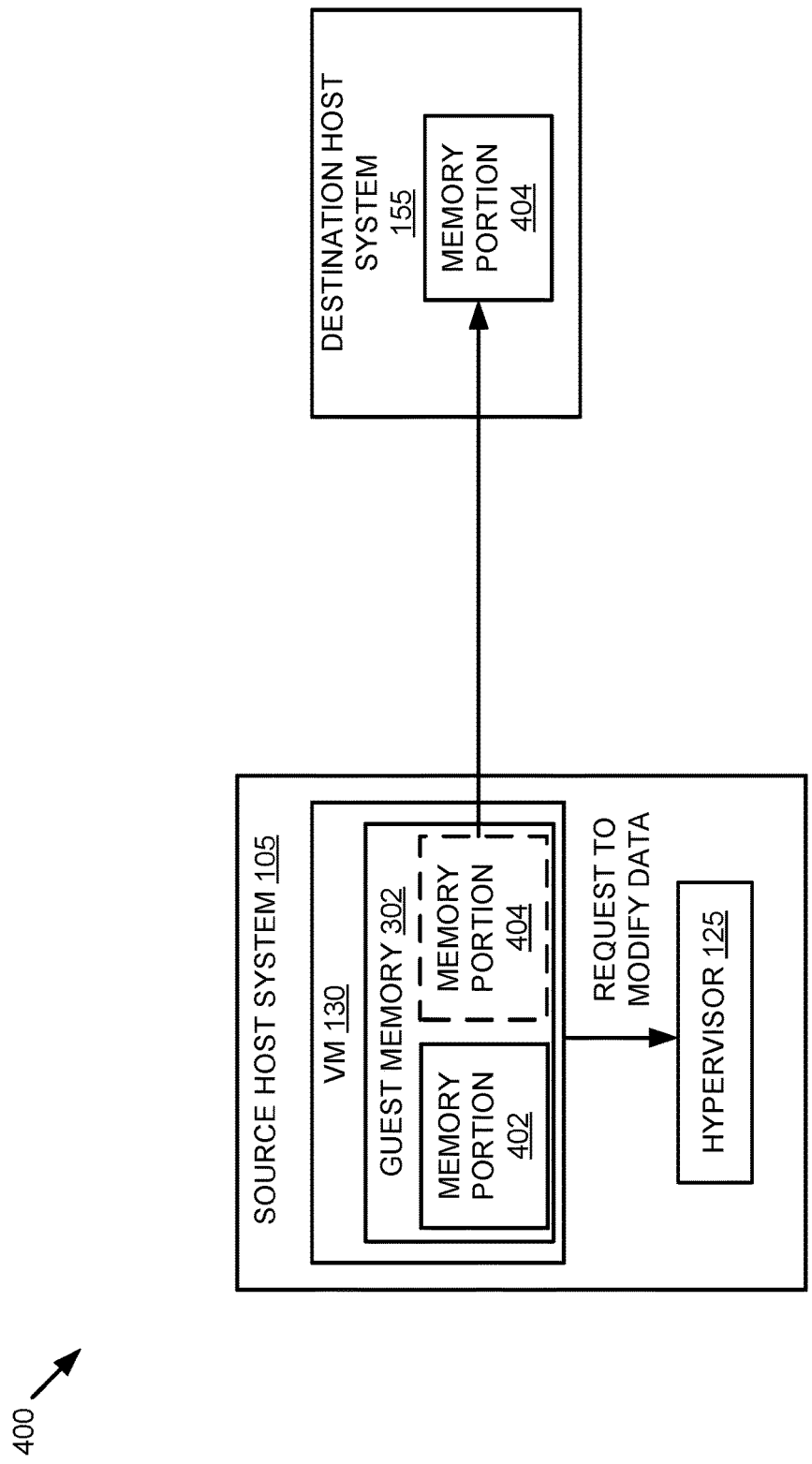
FIG. 4 is an illustration of an example of a hypervisor determining whether to allow access to a portion of guest memory during migration of the guest memory in accordance with some embodiments of the disclosure.

FIG. 4 is an illustration 400 of an example of a hypervisor determining whether to allow access to a portion of guest memory during migration of the guest memory in accordance with some embodiments of the disclosure. As previously described, to prevent the loss of data during a VM migration, the hypervisor 125 may prevent the accessing and/or modifying of data stored at the guest memory 302 during migration of the guest memory 302 from source host system 105 to destination host system 155. Furthermore, as previously described, upon disabling host system access by the device, requests to access the guest memory 302 by the VM 130 are routed through the hypervisor 125. The hypervisor 125 may then determine whether to allow VM 130 to access the guest memory 302. For example, if the VM 130 requests to access a portion of the guest memory 302 that has been migrated to destination host system 155, then hypervisor 125 may determine to not allow access to the guest memory 302. The hypervisor 125 may deny access to the guest memory 302 because the portion of guest memory 302 being accessed has already been copied to destination host system 155. Accordingly, any modifications to the portion of data made on source host system 105 will not be reflected in the copy of the portion of data on destination host system 155 because the modifications were made after the migration of the portion of data. However, if the VM 130 requests to access a portion of the guest memory 302 that has not been migrated to destination host system 155, then hypervisor 125 may determine to allow access to the portion of the guest memory 302 since any modifications to data at the portion of the guest memory 302 will be preserved when the portion of the guest memory 302 is migrated to destination host system 155.

Referring to FIG. 4, guest memory 302 includes memory portion 402 and memory portion 404. Memory portion 404 has been migrated from source host system 105 to destination host system 155, while memory portion 402 has not yet been migrated from source host system 105 to destination host system 155. Accordingly, if VM 130 requests to modify data or store new data at memory portion 402, hypervisor 125 may allow VM 130 to modify or store data at memory portion 402 because memory portion 402 has not yet been migrated to destination host system 155. However, if VM 130 requests to modify data or store new data at memory portion 404, hypervisor 125 may not allow VM 130 to modify or store data at memory portion 404 because memory portion 404 has already been migrated to destination host system 155.

Figure 5:
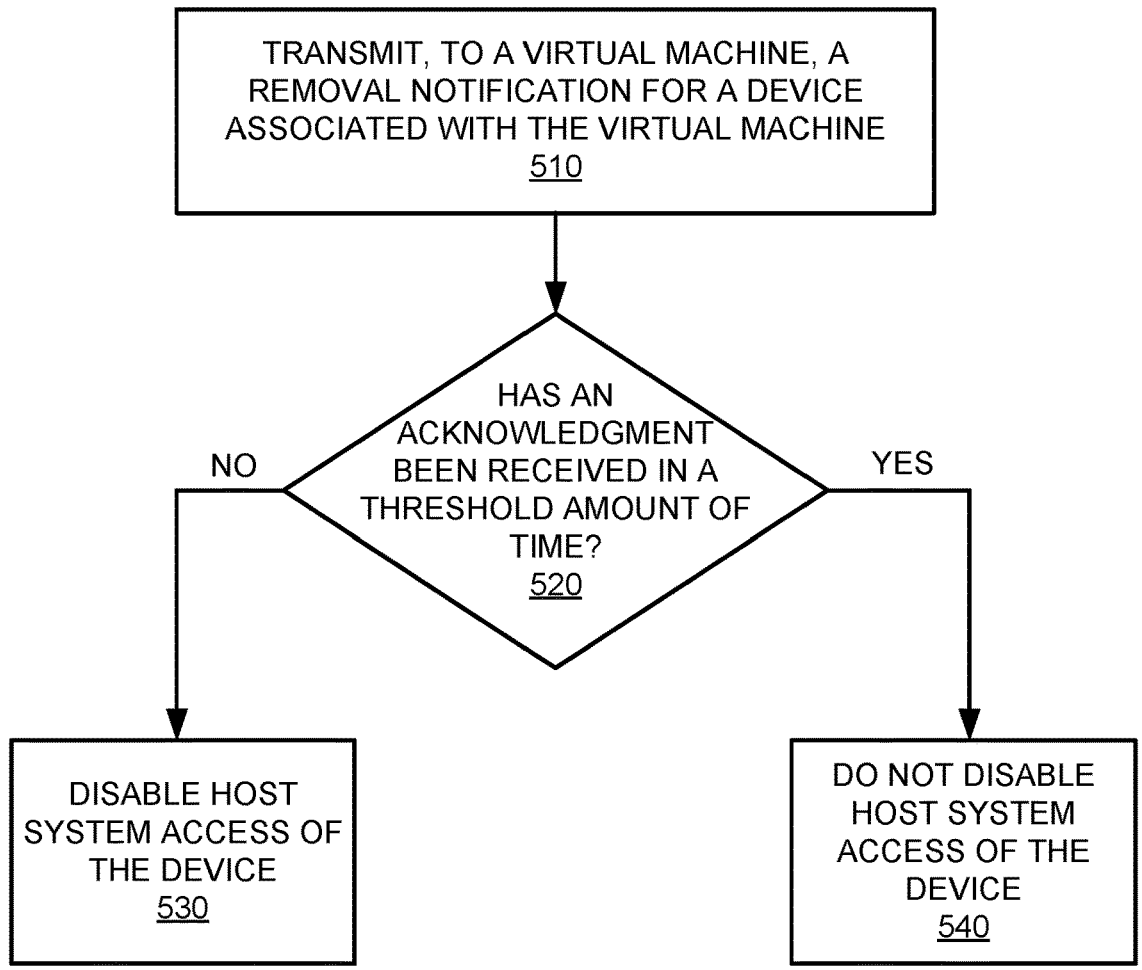
FIG. 5 is a flow diagram of a method of determining whether to perform a partial surprise removal process based on receiving an acknowledgment to a removal notification, in accordance with some embodiments of the present disclosure.

FIG. 5 is a flow diagram of a method 500 of determining whether to perform a partial surprise removal process based on receiving an acknowledgment to a removal notification, in accordance with some embodiments of the present disclosure. The method 500 may be performed by processing logic that comprises hardware (e.g., circuitry, dedicated logic, programmable logic, microcode, etc.), software (e.g., instructions run on a processing device to perform hardware simulation), or a combination thereof. In embodiments, aspects of method 500 may be performed by surprise removal component 128 of FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

In some embodiments, prior to performing a partial surprise removal of a device associated with a VM, the processing logic may first attempt to perform a conventional device removal process by transmitting a removal notification to the VM that may cause the VM to remove the device. However, to prevent any unwanted delays to the migration of the VM, if an acknowledgement of the removal notification is not received within a determined amount of time the processing logic may perform a partial surprise removal of the device, as previously described.

Referring to FIG. 5, at block 510 the processing logic transmits a removal notification for a device associated with the VM to the VM. At block 520, the processing device determines if an acknowledgment to the removal notification is received from the VM within a threshold amount of time since the transmission of the removal notification to the VM. The acknowledgment may indicate that the VM has successfully removed the device. For example, if the threshold amount of time is 500 milliseconds (ms) and more than 500 ms have elapsed since the transmission of the removal notification and an acknowledgment has not been received, then the acknowledgment has not been received in the threshold amount of time.

If the acknowledgement has not been received in the threshold amount of time, at block 530 the processing logic begins the partial surprise removal process by disabling host system access of the device, as previously described. If the acknowledgment is received within the threshold amount of time, at block 540 the processing logic determines to not disable host system access of the device.

Figure 6:
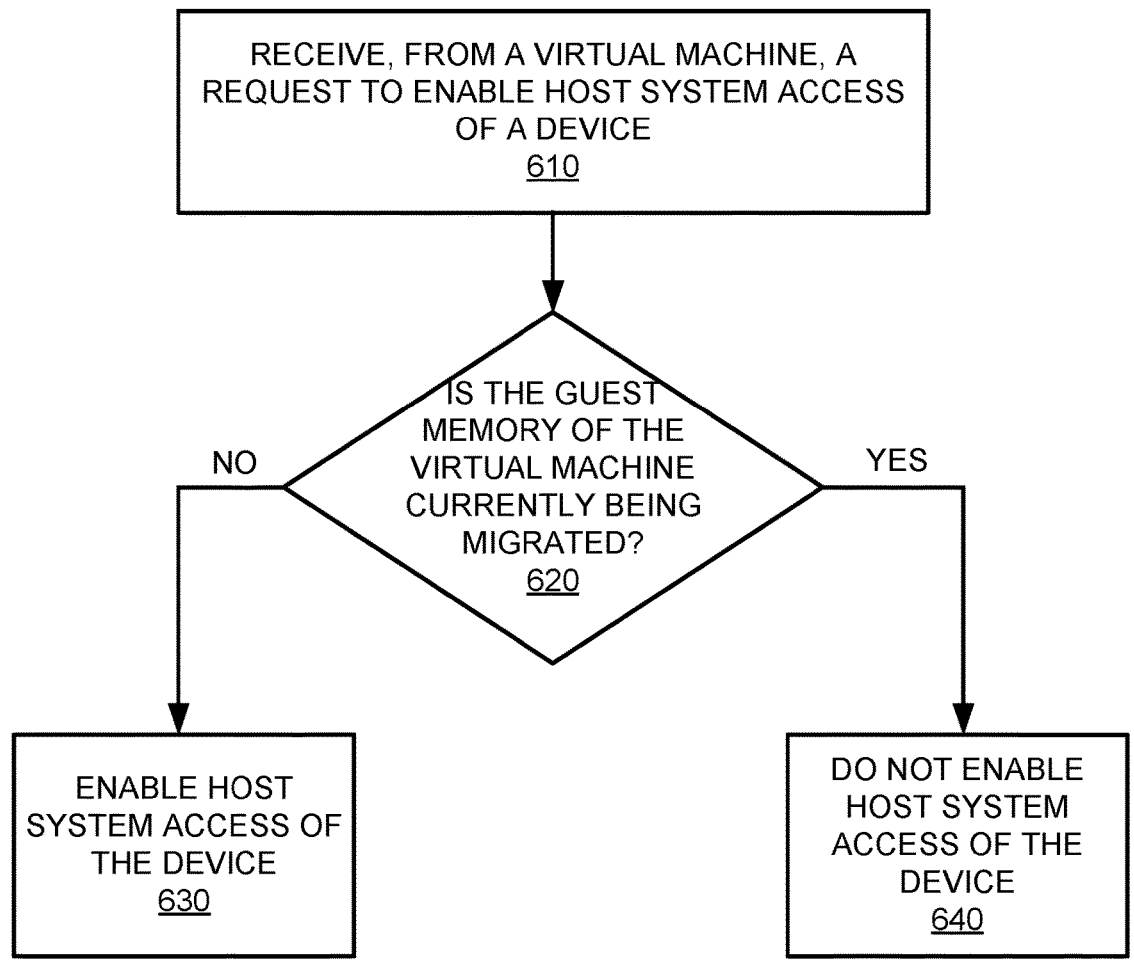
FIG. 6 is a flow diagram of a method of determining whether to enable host, in accordance with some embodiments of the present disclosure.

FIG. 6 is a flow diagram of a method 600 of determining whether to enable host, in accordance with some embodiments of the present disclosure. The method 600 may be performed by processing logic that comprises hardware (e.g., circuitry, dedicated logic, programmable logic, microcode, etc.), software (e.g., instructions run on a processing device to perform hardware simulation), or a combination thereof. In embodiments, aspects of method 600 may be performed by surprise removal component 128 of FIG. 1.

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

Referring to FIG. 6, at block 610 the processing logic receives a request to enable host system access of a device. In some embodiments, upon determining that host system access of the device has been disabled, the device driver running on the VM may request or transmit a direction to re-enable host system access of the device.

At block 620, the processing logic determines if the guest memory of the VM is currently being migrated to a destination host system. As previously described, if the guest memory is currently being migrated to the destination host system, any critical data or modifications to data stored at the guest memory may be lost during migration. However, if the guest memory is not currently being migrated to the destination host system, then there may be no risk of losing the critical data or modifications of data stored at the guest memory. Accordingly, if the processing logic determines that the guest memory is not currently being migrated, at block 630 the processing logic enables host system access of the device. For example, the processing logic may enable bus mastering for the device. However, if the processing logic determines that the guest memory is currently being migrated, at block 640 the processing logic determines to not enable host system access of the device.

Figure 7:
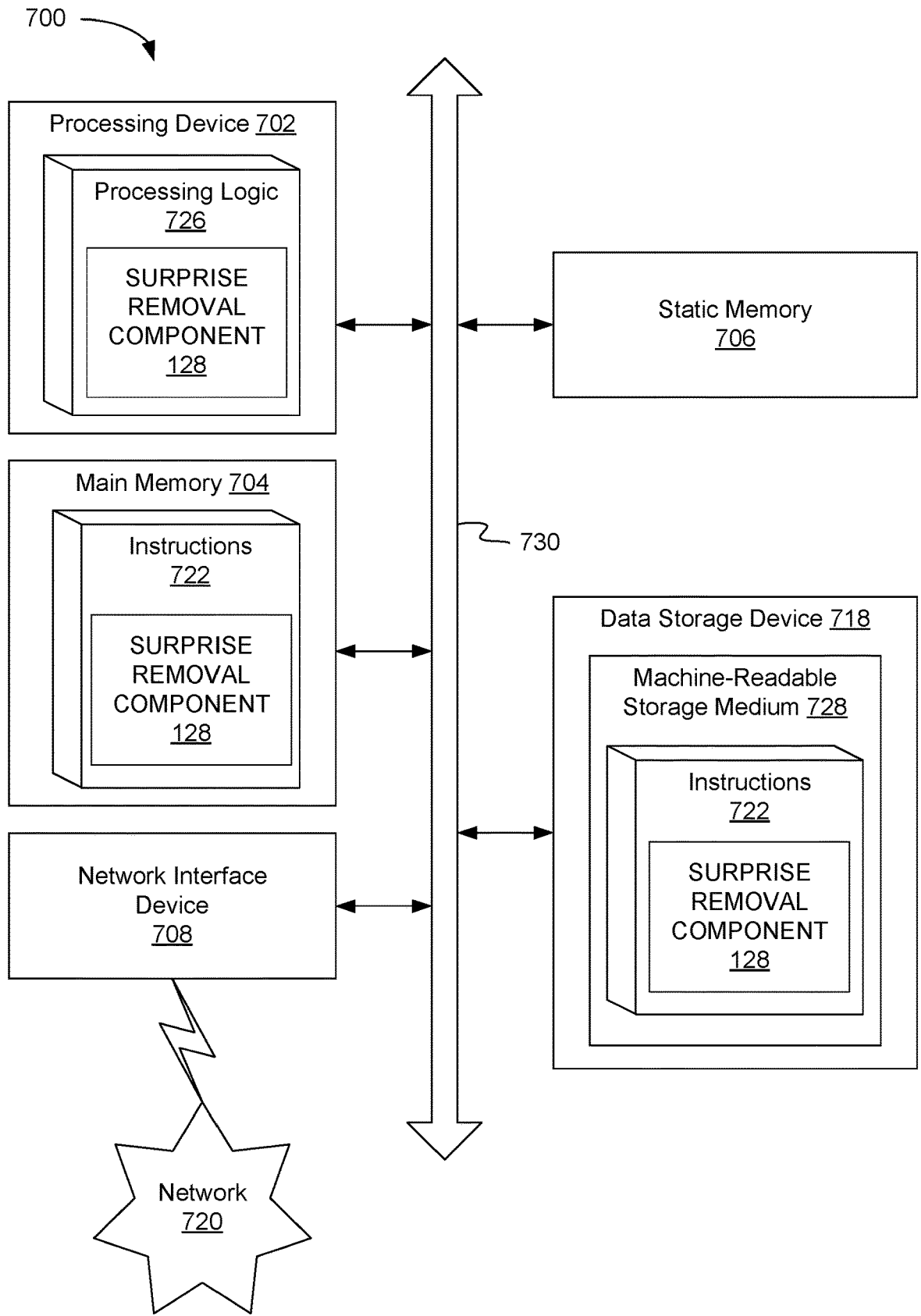
FIG. 7 depicts a block diagram of an illustrative computer system operating in accordance with examples of the invention.

FIG. 7 illustrates a diagrammatic representation of a machine in the example form of a computer system 700 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a host system, such as source host system 105 and destination host system 155 configured to perform partial surprise removal of devices for VM migration.

The exemplary computer system 700 includes a processing device 702, a main memory 704 (e.g., read-only memory (ROM), flash memory, dynamic random access memory (DRAM), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute processing logic 726, which may be one example of surprise removal component 128 of FIG. 1, for performing the operations and steps discussed herein.

The data storage device 718 may include a non-transitory computer-readable storage medium 728, on which is stored one or more set of instructions 722 (e.g., software) embodying any one or more of the methodologies of functions described herein, including instructions to cause the processing device 702 to execute surprise removal component 128. The instructions 722 may also reside, completely or at least partially, within the main memory 704 or within the processing device 702 during execution thereof by the computer system 700; the main memory 704 and the processing device 702 also constituting machine-readable storage media. The instructions 722 may further be transmitted or received over a network 720 via the network interface device 708.

The non-transitory computer-readable storage medium 728 may also be used to store instructions to perform a method for multi-level task debugging, as described herein. While the non-transitory computer-readable storage medium 728 is shown in an exemplary embodiment to be a single medium, the term "computer-readable storage medium" should be taken to include a single medium or multiple media (e.g., a centralized or distributed database, or associated caches and servers) that store the one or more sets of instructions. A computer-readable medium includes any mechanism for storing information in a form (e.g., software, processing application) readable by a machine (e.g., a computer). The computer-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof

What is claimed is:

1. A method, comprising:
   disabling, by a processing device of a source host system executing a hypervisor, host system access of a device associated with a virtual machine, wherein disabling the host system access prevents the virtual machine from directly accessing guest memory via the device and prevents the device from causing an interrupt;
   migrating the guest memory associated with the virtual machine from the source host system to a destination host system;
   upon migrating the guest memory associated with the virtual machine from the source host system to the destination host system, causing initiation of the virtual machine on the destination host system; and
   transmitting, to the destination host system, a notification indicating a partial surprise removal of the device associated with the virtual machine, the notification comprising information associated with the partial surprise removal of the device.

2. The method of claim 1, wherein disabling the host system access of the device associated with the virtual machine comprises:
   disabling, by the hypervisor, bus mastering of the device.

3. The method of claim 1, further comprising:
   transmitting, to the virtual machine, a notification indicating a partial surprise removal of the device associated with the virtual machine.

4. The method of claim 1, further comprising:
   receiving, from the virtual machine, a request to enable host system access of the device;
   determining whether the guest memory associated with the virtual machine is currently being migrated from the source host system to the destination host system; and
   in response to determining that the guest memory associated with the virtual machine is currently being migrated from the source host system to the destination host system, determining to not enable host system access of the device.

5. The method of claim 1, further comprising:
   receiving, from the virtual machine during the migration of the guest memory associated with the virtual machine from the source host system to the destination host system, a request to modify data stored at a portion of the guest memory;
   determining whether the data stored at the portion of the guest memory has been migrated from the source host system to the destination host system; and
   in response to determining that the data stored at the portion of the guest memory has not been migrated from the source host system to the destination host system, enabling the virtual machine to modify the data stored at the portion of the guest memory.

6. The method of claim 1, further comprising:
   transmitting, to the virtual machine, a removal notification for the device associated with the virtual machine;
   determining whether an acknowledgment to the removal notification has been received from the virtual machine within a threshold amount of time; and
   in response to determining that the acknowledgment to the removal notification has not been received within the threshold amount of time, disabling the host system access to the device associated with the virtual machine.

7. A system, comprising:
   a memory; and
   a processing device of a source host system, operatively coupled to the memory, to execute a hypervisor to:
     disable host system access of a device associated with a virtual machine, wherein disabling the host system access prevents the virtual machine from directly accessing guest memory via the device and prevents the device from causing an interrupt;

migrate the guest memory associated with the virtual machine from the source host system to a destination host system;

upon migrating the guest memory associated with the virtual machine from the source host system to the destination host system, cause initiation of the virtual machine on the destination host system; and transmit, to the destination host system, a notification indicating a partial surprise removal of the device associated with the virtual machine, the notification comprising information associated with the partial surprise removal of the device.

8. The system of claim 7, wherein to disable the host system access of the device associated with the virtual machine, the processing device is further to:

disable, by the hypervisor, bus mastering of the device.

9. The system of claim 7, wherein the processing device is further to:

transmit, to the virtual machine, a notification indicating a partial surprise removal of the device associated with the virtual machine.

10. The system of claim 7, wherein the processing device is further to:

receive, from the virtual machine, a request to enable host system access of the device;

determine whether the guest memory associated with the virtual machine is currently being migrated from the source host system to the destination host system; and in response to determining that the guest memory associated with the virtual machine is currently being migrated from the source host system to the destination host system, determine to not enable host system access of the device.

11. The system of claim 7, wherein the processing device is further to:

receive, from the virtual machine during the migration of the guest memory associated with the virtual machine from the source host system to the destination host system, a request to modify data stored at a portion of the guest memory;

determine whether the data stored at the portion of the guest memory has been migrated from the source host system to the destination host system; and in response to determining that the data stored at the portion of the guest memory has not been migrated from the source host system to the destination host system, enable the virtual machine to modify the data stored at the portion of the guest memory.

12. The system of claim 7, wherein the processing device is further to:

transmit, to the virtual machine, a removal notification for the device associated with the virtual machine;

determine whether an acknowledgment to the removal notification has been received within a threshold amount of time; and in response to determining that the acknowledgment to the removal notification has not been received within the threshold amount of time, disable the host system access of the to the device associated with the virtual machine.

13. A non-transitory computer-readable storage medium including instructions that, when executed by a processing device of a source host system, cause the processing device to:

disable, by the processing device executing a hypervisor, host system access of a device associated with a virtual machine, wherein disabling the host system access prevents the virtual machine from directly accessing guest memory via the device and prevents the device from causing an interrupt;

migrate the guest memory associated with the virtual machine from the source host system to a destination host system;

upon migrating the guest memory associated with the virtual machine from the source host system to the destination host system, cause initiation of the virtual machine on the destination host system; and transmit, to the destination host system, a notification indicating a partial surprise removal of the device associated with the virtual machine, the notification comprising information associated with the partial surprise removal of the device.

14. The non-transitory computer-readable storage medium of claim 13, wherein to disable the host system access of the device associated with the virtual machine, the processing device is further to:

disable, by the hypervisor, bus mastering of the device.

15. The non-transitory computer-readable storage medium of claim 13, wherein the processing device is further to:

receive, from the virtual machine, a request to enable host system access of the device;

determine whether the guest memory associated with the virtual machine is currently being migrated from the source host system to the destination host system; and in response to determining that the guest memory associated with the virtual machine is currently being migrated from the source host system to the destination host system, determine to not enable host system access of the device.

16. The non-transitory computer-readable storage medium of claim 13, wherein the processing device is further to:

receive, from the virtual machine during the migration of the guest memory associated with the virtual machine from the source host system to the destination host system, a request to modify data stored at a portion of the guest memory;

determine whether the data stored at the portion of the guest memory has been migrated from the source host system to the destination host system; and in response to determining that the data stored at the portion of the guest memory has not been migrated from the source host system to the destination host system, enable the virtual machine to modify the data stored at the portion of the guest memory.

17. The non-transitory computer-readable storage medium of claim 13, wherein the processing device is further to:

transmit, to the virtual machine, a removal notification for the device associated with the virtual machine;

determine whether an acknowledgment to the removal notification has been received within a threshold amount of time; and in response to determining that the acknowledgment to the removal notification has not been received within the threshold amount of time, disable the host system access of the to the device associated with the virtual machine.

* * * * *

UNITED STATES PATENT AND TRADEMARK OFFICE
CERTIFICATE OF CORRECTION

PATENT NO. : 11,093,275 B2
APPLICATION NO. : 16/392359
DATED : August 17, 2021
INVENTOR(S) : Michael Tsirkin It is certified that error appears in the above-identified patent and that said Letters Patent is hereby corrected as shown below:

In the Claims

Column 13, Line 59, in Claim 12, cancel the text 'of the'

Column 14, Line 63, in Claim 17, cancel the text 'of the'

Signed and Sealed this
Twenty-first Day of March, 2023

*Katherine Kelly Vidal*

Katherine Kelly Vidal
*Director of the United States Patent and Trademark Office*